United States Patent [19]

Geuenich et al.

[11] Patent Number: 4,741,826
[45] Date of Patent: May 3, 1988

[54] FILTER CLOTH SECURING DEVICE FOR A PLATE FILTER PRESS

[75] Inventors: Matthias Geuenich, Langerwehe-Merode; Heinz Bonn, Kreuzau-Winden, both of Fed. Rep. of Germany

[73] Assignee: Eberhard Hoesch & Söhne GmbH & Co., Düren, Fed. Rep. of Germany

[21] Appl. No.: 931,124

[22] Filed: Nov. 17, 1986

[30] Foreign Application Priority Data

Nov. 16, 1985 [DE] Fed. Rep. of Germany ....... 3540786

[51] Int. Cl.⁴ ............................................. B01D 25/12
[52] U.S. Cl. .................................. 210/228; 100/197; 210/231
[58] Field of Search .............................. 210/224–231; 100/196, 197

[56] References Cited

U.S. PATENT DOCUMENTS

| | | | |
|---|---|---|---|
| 3,503,326 | 3/1970 | Juhasz et al. | 210/231 X |
| 3,888,769 | 6/1975 | Schotten et al. | 210/231 X |
| 3,931,014 | 1/1976 | Heimbach et al. | 210/231 |
| 4,486,305 | 12/1984 | Nakamura | 210/227 |

FOREIGN PATENT DOCUMENTS

| | | |
|---|---|---|
| 2324876 | 1/1983 | Fed. Rep. of Germany . |
| 2322044 | 2/1983 | Fed. Rep. of Germany . |
| 3403163 | 1/1984 | Fed. Rep. of Germany ...... 210/231 |
| 2069360 | 8/1981 | United Kingdom ............. 210/231 |

Primary Examiner—Richard V. Fisher
Assistant Examiner—W. Gary Jones
Attorney, Agent, or Firm—Spencer & Frank

[57] ABSTRACT

A filter cloth securing device attaches a filter cloth in the zone of the slurry port of a filter plate. A plurality of face-to-face arranged filter plates constitute a filter plate stack of a plate filter press. Each filter cloth securing device has two flanged sleeves inserted from either side of the slurry port and a threaded tightening sleeve which passes through the slurry port and which tightens the flanged sleeves to one another to thus clamp the filter cloth against the filter plate face. In the closed state of the filter plate stack face-to-face oriented flanged sleeves belonging to consecutive filter plates define an annular clearance and further, at least one flanged sleeve of the filter cloth securing device has on its outer face at least one protuberance which projects towards the outer flange face of an adjoining flanged sleeve, belonging to a consecutive filter plate. The protuberance ends at a distance from the last-named outer flange face.

14 Claims, 4 Drawing Sheets

U.S. Patent  May 3, 1988  Sheet 4 of 4  4,741,826
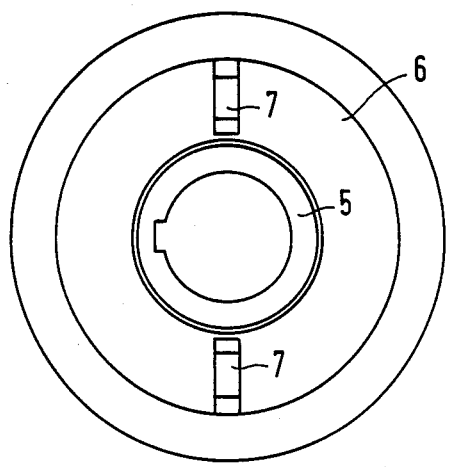
FIG. 6
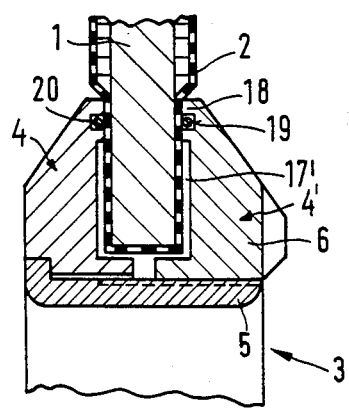   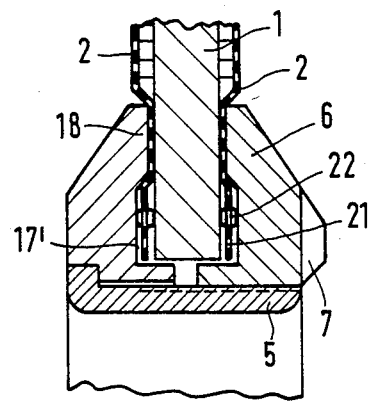
FIG. 7　　　　FIG. 8

FILTER CLOTH SECURING DEVICE FOR A PLATE FILTER PRESS

BACKGROUND OF THE INVENTION

This invention relates to a filter cloth securing device which attaches the filter cloth to the filter plates of a plate filter press in the zone of the plate opening (port) provided for the passage of the slurry. The securing device has two flanged sleeves inserted into the slurry port from opposite sides of the filter plate and a threaded tensioning sleeve which also passes through the slurry port and which axially clamps the flanged sleeves to one another. The flanges of the flanged sleeves extend essentially parallel to the plane of the filter plate.

In chamber-type or diaphragm chamber-type filter presses where the slurry inlet is arranged in the zone of the filtering face of the filter plates, the filter cloth must be sealed with respect to the edge zones of the slurry ports. Such seal is of importance in case of individual or continuous filter cloths as well as in case of tubular or pass-through filter cloths in order to prevent a filtering effect and thus a filter cake formation within the slurry channel constituted by the series of axially aligned slurry ports. As securing and sealing means generally the earlier-noted flanged sleeves are used whose flanges press the filter cloth against the respective filter plate side in the wall zone of the slurry port.

In order to ensure an optimal utilization of a filter press, it is desired that the filter cakes in all filter chambers be identically thick. This is of particular importance in case the filter cakes have to be washed or dried in the filter press, because only a uniform filter cake thickness ensures a uniform washing and drying effect. A uniform cake thickness, however, preconditions identical chamber depths which in turn require an accurately central positioning of the filtering face in the individual filter plates. Particularly in filter plates made of synthetic materials, deformations of the filtering face from the central plate plane may occur because of stresses applied during manufacture, shipping or storage. Furthermore, in case of hot filtering, the filtering face may undergo bulging deformations even in case of very small pressure differences resulting, for example, from non-uniform filter cloth soiling. Such deformations may lead to a cracking or breakage of the filter plate.

In diaphragm-type filter presses a bending of the filtering face and thus an increased filter chamber depth on one filter plate side has the additional disadvantage that the diaphragm may press annularly into the slurry channel on that side so that the diaphragm may be torn away from its securing device or may be torn open.

In order to prevent a bending deformation of the filtering face, U.S. Pat. No. 3,503,326 discloses the use of tubular screw-in flanges which are threaded into corresponding passages of the filter plate from both sides and wherein the tubular part of the components constitutes the slurry port and the flanges sealingly clamp the filter cloth against a cooperating counterface of the filter plate. The flanges have such a thickness dimension that in the closed (pushed-together) state of the filter plate stack they lie on one another and thus are in a mutually supportive relationship. The slurry inflow in the individual filter chambers is effected by radial grooves provided in the outer surfaces of the flanges. In such a structure the grooves of two superposed flanges of adjoining filter plates complement each other to form a closed channel. It is a disadvantage of this arrangement that the screw flanges must have an accurate angular (screwed-in) orientation in order to position the grooves such that in the closed state of the filter plate stack the grooves of adjoining flanges complement each other to form a slurry channel. Considering the permissible tolerance deviations, this requirement cannot be satisfied with the desired accuracy.

It is a further disadvantage of the above-outlined prior art arrangement that upon tightening the screw flanges, as a result of friction that part of the filter cloth which lies underneath the flange faces is dragged by the flange As a result, folds may appear which can cause leaks between the slurry channel and the filtering spaces. If the threaded flanges are not tightened sufficiently, the individual filter cloth securements may abut one another in an axial direction even before the filter plates are tightly pressed to one another at their outer sealing edges. As a result, the filtering chambers will not be separated from the environment in a fluidtight manner. It is still another disadvantage of this prior art arrangement that during the emptying process solid deposit residues may clog the channels formed by the grooves.

A similar construction is known in the field of chamber-type filter plates which are utilized as a combination with diaphragm-type filter plates known from German Patent Nos. 2,322,044 and 2,324,876. In this arrangement too, screw-in flanges are provided which are tightened against one another by a threaded bushing and thus clamp the filter cloth. In this arrangement too, the slurry is admitted into the filter chamber from a slurry port formed by the threaded sleeve and through radial grooves provided in the outer faces of the flanges. The flanges are configured such that the diaphragms of the adjoining diaphragm filter plates annularly lie against the flanges upon inflation and cover the mouth of the radial grooves in the filter chamber. This prior art arrangement too, has the disadvantage that the radial grooves are clogged by the filter cake and also, during the pressing step, the diaphragms additionally press filter cake portions from the filter chamber into the radially extending grooves.

In all known structures of filter cloth securing devices solid deposits do not detach by themselves from the radial grooves during the opening of the filter press. Further, as the filter cake falls down in the zone of the slurry intake, solid parts are sheared off the filter cake and remain suspended in the slurry ports, particularly because of the recessed end faces of the threaded sleeves. Risks are high that these residues may block the radial grooves in the outer faces of the flanges during the subsequent operational cycle. Consequently, the grooves as well as the slurry ports of the individual filter plates have to be carefully cleaned manually in each filter chamber after opening the filter press in order to avoid any damage during the subsequent filtering cycle. A cleaning of the slurry ports and the radial groove is, however, not readily feasible because of the particular configuration of the filter cloth securing devices. Furthermore, because of a need for the manual cleaning, the advantage of a mechanized plate shifting apparatus which should make possible an automatic filtering operation is partially lost, and thus the time needed for the manual cleaning work adversely affects the output of the filter press.

SUMMARY OF THE INVENTION

It is an object of the invention to provide an improved filter cloth securing device of the above-outlined type which ensures a uniform charging of all the chambers of the filter press, which prevents the formation of solid deposits during operation and which, during the opening of the filter press, does not allow filter cake deposits which would require an additional cleaning input.

This object and others to become apparent as the specification progresses, are accomplished by the invention, according to which, briefly stated, in the closed (pushed-together) state of the filter plates the essentially planar outer faces of the adjoining flanges of the flange sleeves of two neighboring filter plates bound an annular clearance and further, at least one flange is provided on its outer face with at least one cam-like elevation (protuberance) which is oriented towards the outer face of the adjoining flange and which terminates at a small distance from the outer face of the adjoining flange.

The invention as outlined above has the advantage that in the closed state of the filter plate stack in which the axially aligned individual slurry ports of the individual filter plates form a throughgoing slurry channel, the slurry inflow to each individual filter chamber occurs through a smooth, annular clearance which is interrupted solely by the cam-like elevation. During the filtering process the slurry flow for each filter chamber is uniform to all sides, so that as early as from the beginning of the filtering process there occurs a uniform solids deposition which results in the formation of a uniform filter cake.

The smooth annular clearance provided according to the invention further ensures that no clogging by solids may occur since the pressurized slurry may itself rinse away any such solid deposits. The slight interruption of the annular clearance by the cam-shaped elevation (protuberance) has no appreciable effect. According to an advantageous feature of the invention, only two cam-shaped elevations are provided which are situated diametrically oppositely on the outer faces of the respective flanges and which, related to the operational position of the filter plates, are situated vertically below one another. If, upon termination of the filtering phase, the filter plate stack is opened (that is, the filter plates are moved away from one another), the filter cake may readily slide downwardly, even over the zone of the filter cloth securing device. Slight shearing effects caused by the cam-shaped elevations or by the slurry ports themselves do not adversely affect the subsequent filtering cycle, because such deposits may be rinsed away by the slurry flow during the subsequent filtering cycle. It is of importance that upon the subsequent closing of the filter plate stack in the zone of the annular clearance itself no deposits will be present. Since the zone of the filter cloth securing devices is formed of a rigid construction, a single cam-shaped elevation in this zone is sufficient to ensure a mutual support of the filtering face. By virtue of the fact that the cam-like elevations terminate at a small distance from the outer face of the flange belonging to the adjoining filter plate, during closing of the filter plate stack the sealing edges in the zone of the outer peripheral edge of the filter plates may be pressed sealingly to one another by the press closing device without interference.

According to a preferred embodiment of the invention, the width $S_1$ of the annular clearance (measured parallel to the axis of slurry port) is so dimensioned that the free cross-sectional passage area of the annular clearance related to the inner diameter $d_1$ of the slurry port is smaller than the free cross-sectional passage area of the slurry port. This arrangement ensures that in the closed state of the filter plate stack all filter chambers of the filter press are charged uniformly with slurry. According to an advantageous feature of the invention, the clearance width $S_1$ is between $0.05d_1$ and $0.15d_1$. This dimensioning means that the above-noted free cross-sectional passage area of the annular clearance is between 20 and 60% of the free cross-sectional passage area of the slurry port. While normally the clearance width $S_1$ between two adjoining outer flange faces is constant in the outward radial direction, according to a particularly advantageous feature of the invention, the clearance width between two adjoining outer flange faces decreases radially outwardly from a radially inner dimension $S_1$. Expediently, the decrease of the clearance width is so dimensioned that the inlet cross section of the annular clearance related to the inner diameter of the slurry port is identical to the outlet cross section of the annular clearance in the zone of the outer diameter of the annular clearance. As a result, the facing outer surfaces of two flanges are slightly conically recessed towards the slurry port so that the risks of a formation of solid deposits during filter cake ejection are further reduced. This feature is of particular significance in filter presses where the filter plate stack is composed alternatingly of chamber-type filter plates and diaphragm chamber-type filter plates, because in this manner there is achieved a closing (separation) of the filter chamber from the slurry channel by the diaphragm as early as during the initial phase of the pressing step. Since, according to the invention, the central plane of the annular clearance between two adjoining flanges lies in the central plane of the filter chamber formed of two superposed filter plates, there is achieved, during rinsing through the slurry channel, a better distribution of the washing liquid in the clearance between the two filter cake layers.

According to a further advantageous feature of the invention, the outer flange edge of the flanged sleeves is bevelled radially outwardly towards the central plane of the filter plate. By virtue of this feature the outer edge of the flange functions as a deflector during the filter cake ejection, so that the lower edge of the slurry port does not, for all practical purposes, come into contact with the filter cake and thus a shearing off of solid particles from the filter cake and deposits in the slurry port are prevented.

According to a further feature of the invention, in a filter plate stack which is formed of alternating chamber-type filter plates and diaphragm chamber-type filter plates, the inside edge of the bevel of the flange of the chamber-type filter plate lies approximately opposite the outer edge of the flange of diaphragm chamber-type filter plate. By virtue of this feature, a disturbance-free closing of the annular clearance by the diaphragm may be achieved during the pressing of the filter cake and, at the same time, the bevel of the outer edge of the flange serves as a support for the diaphragm in this zone and thus an excessive expansion of the diaphragm is avoided.

According to a particularly advantageous further feature of the invention, the flange, on its side oriented towards the filter cloth, has in the zone of its outer circumference a circumferential web (annular skirt)

which projects towards the filter cloth. This arrangement has the advantage that upon tightening together the two flanged sleeves by the threaded clamping sleeve, the two flanges engage the filter cloth only with the annular skirt, so that the sealing forces between the flange and the filter cloth become effective only along this outer annular surface. Upon tightening the two flanged sleeves, the flanges are elastically deformed so that, for example, in case of an axial expansion caused by a temperature increase, there is ensured a minimum pressing force and thus a satisfactory seal between the web and the filter cloth is maintained. Such an arrangement is also advantageous if individual filter cloths are used because in such a case the filter cloth edge surrounding the slurry port may have a corresponding bead (thickening), provided, for example, by vulcanization or sewing. The bead lies in the undercut part of the flange, bounded by the annular skirt. The bead functions as a seal and also, it effects a form-fitting clamping of the filter cloth in that zone.

According to a further feature of the invention, the outer face of the annular skirt has a circumferential, open groove which accommodates a sealing element, such as an O-ring. This arrangement is advantageous in that it further increases the sealing effect between the annular skirt and the filter cloth.

BRIEF DESCRIPTION OF THE DRAWING

FIG. 6 is a front elevational detail of FIG. 1 viewed in the direction of arrow A of FIG. 1.

FIG. 7 is a fragmentary sectional side elevational view of a further preferred embodiment of the invention.

FIG. 8 is a view similar to FIG. 7, illustrating still another preferred embodiment of the invention.

DESCRIPTION OF THE PREFERRED EMBODIMENTS

Figure 1:
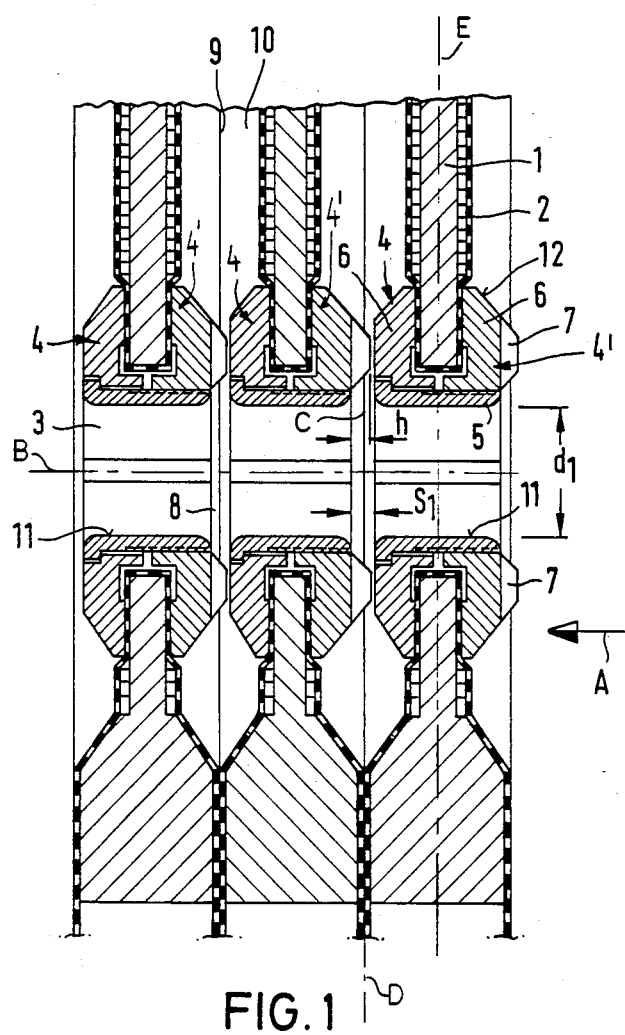
FIG. 1 is a fragmentary sectional side elevational view of a closed filter plate stack in the zone of the slurry port, illustrating a preferred embodiment of the invention.

Turning now to the embodiment of the invention illustrated in FIG. 1, there are shown three filter plates 1 of a filter plate stack, illustrated in a closed (pushed-together) position. Each filter plate 1 is provided on both plate faces with a filter cloth 2 which is sealingly secured to the plate face along an annular area about a slurry port 3 by means of inserted flanged sleeves 4, 4' axially clamped against one another by means of a threaded tightening sleeve 5. Each slurry port 3 has an axis B. The flange 6 of the flanged sleeve 4' has on its outer face two diametrically opposite cam-like elevations (protuberances) 7 whose height h is smaller than the width $S_1$ of an annular clearance 8 formed by the flanges 6 of two adjoining flanged sleeves 4, 4' belonging to two consecutive filter plates 1. Expediently, the height h is approximately 0.5 to 1.5 mm less than the gap width $S_1$. By virtue of this arrangement, the filter plates may support one another in case of bending deformations resulting from differential pressure. The arrangement also ensures that during the closing (pushing-together) of the filter plate stack, the sealing edges 9 at the outer periphery of the filter plates 1 may be pressed to one another in a fluidtight manner. Any two adjoining filter plates 1 define a filter chamber 10.

Each annular gap 8 has a central plane C which lies in the central plane D of the respective filter chamber 10, defined by the sealing edges 9. This arrangement ensures a practically symmetrical flow of the slurry from the slurry inlet channel formed by the aligned slurry ports 3 into the respective filter chambers 10. Since in the embodiment shown in FIG. 1 there are provided only two diametrically oppositely arranged protuberances (cam-like elevations) 7 on the outer face of the flange 6 of the flanged sleeves 4' mounted such that in the operational position of the filter plate they are disposed vertically underneath one another, it is readily seen that during filter cake ejection no deposits may be formed because the elevations 7 merely score the downwardly sliding filter cake without being able to shear off filter cake portions therefrom. This is particularly the case for the lower zone 11 of the slurry port 3. FIG. 6 illustrates this construction as viewed axially, that is, in the direction of arrow A of FIG. 1. It is further of significance that the outer edge zone of the flange 6 is formed as a bevel 12, tapering radially outwardly in the direction of the central plane E of the respective filter plate 1. It is the function of the bevel 12 that during ejection of the filter cake it acts as a slide or deflector so that the cake surface will pass at a distance from the zone 11 of the slurry port 3.

Referring once again to FIG. 6, the annular clearance 8 is—as viewed circumferentially—only slightly interrupted by the two diametrically opposite cam-like protuberance 7 so that no deposits may be formed there during slurry inflow. In case filtering processes are carried out which involve adhesive solids and they form deposits in these zones, in the subsequent filtering step they are securely rinsed away because the slurry which, at the beginning of the filtering step, has a relatively high flow speed, is capable of washing away such deposits.

The gap width $S_1$ is so dimensioned that, according to particular modes of application, it is between $0.05 d_1$ and $0.15 d_1$, wherein $d_1$ is the inner diameter of the threaded tightening sleeve 5, defining the slurry port 3. By virtue of such a dimensioning, the annular gap 8, related to the inner diameter of the slurry port 3, has a cross-sectional passage area of about 20-60% of the inner cross-sectional passage area of the slurry port 3.

Figure 2:
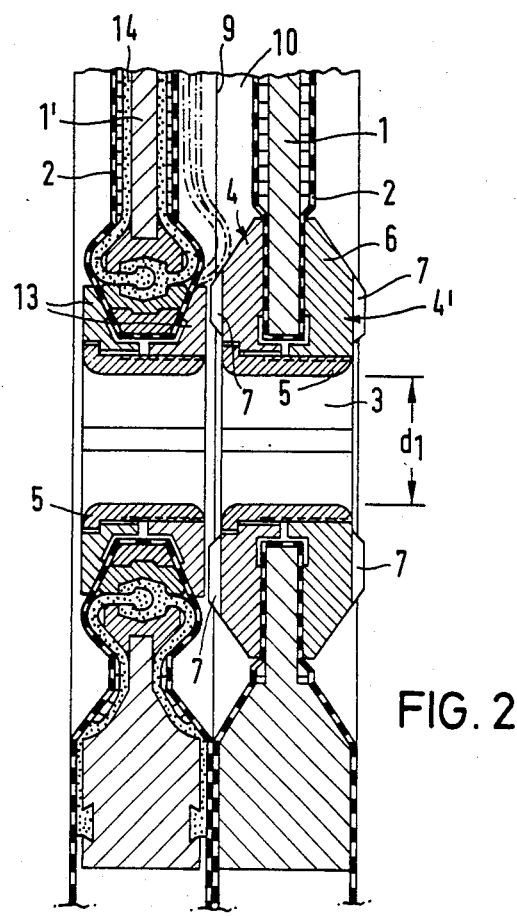
FIG. 2 is a fragmentary sectional side elevational view of a closed filter plate stack, illustrating another preferred embodiment.

Turning to FIG. 2, there is illustrated another preferred embodiment of the invention. In the construction illustrated in FIG. 2 the filter chamber 10 is defined by a chamber-type filter plate 1 and a diaphragm chamber-type filter plate 1'. In the filter plate stack the two plate types 1 and 1' are arranged in an alternating sequence. The structure and operation of such a filter press are conventional and are therefore not described in further detail.

In the embodiment shown in FIG. 2, both flanged sleeves 4' belonging to one chamber filter plate 1 carry protuberances 7, while the flanged sleeves 13 of the filter cloth securing device belonging to the diaphragm chamber-type filter plate 1' are void of protuberances 7 and have a smaller outer diameter than the flanges 6 of the flanged sleeves 4' associated with the chamber-type filter plate 1 in order to ensure a sufficient free space for the edge of the pressing diaphragm 14 extending underneath the filter cloth 2. This arrangement too, ensures a mutual support of the filter plates in the zone of the slurry ports in case bending stresses occur.

Figure 3:
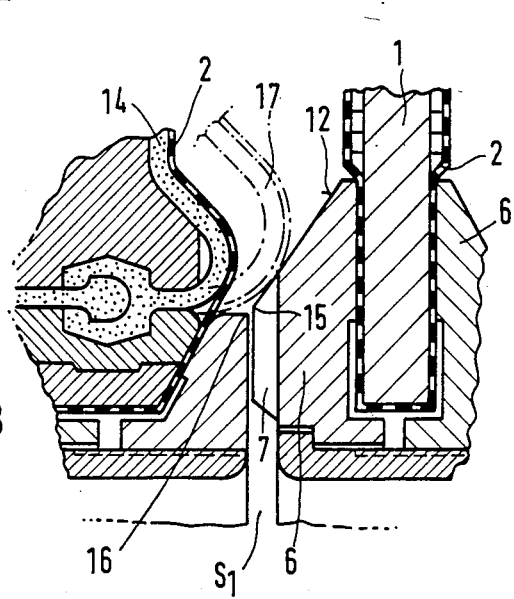
FIG. 3 is an enlarged sectional view of a detail of FIG. 2.

With particular reference to FIG. 3 which is an enlarged detail of FIG. 2, it is seen that the bevel 12 on the flange 6 of the flanged sleeves 4' of the chamber-type filter plate 1 is so oriented that the radially inner edge 15 of the bevel 12 which is formed in this zone by the edges of the elevation 7, terminates approximately at the height of the outer edge 16 of the flanged sleeve 13 associated with the diaphragm chamber-type filter plate 1'. This arrangement ensures that during the performance of the pressing step in which pressurized fluid introduced behind the diaphragm 14 shifts the diaphragm by the pressing force into its dash-dotted position into the filter chamber 10, first, the edge 17 of the diaphragm 14 rapidly covers the annular clearance 8 and second, the diaphragm 14 can be supported on the bevel 12 so that an excessive expansion of the diaphragm 14 in its clamping zone is avoided.

Figure 4:
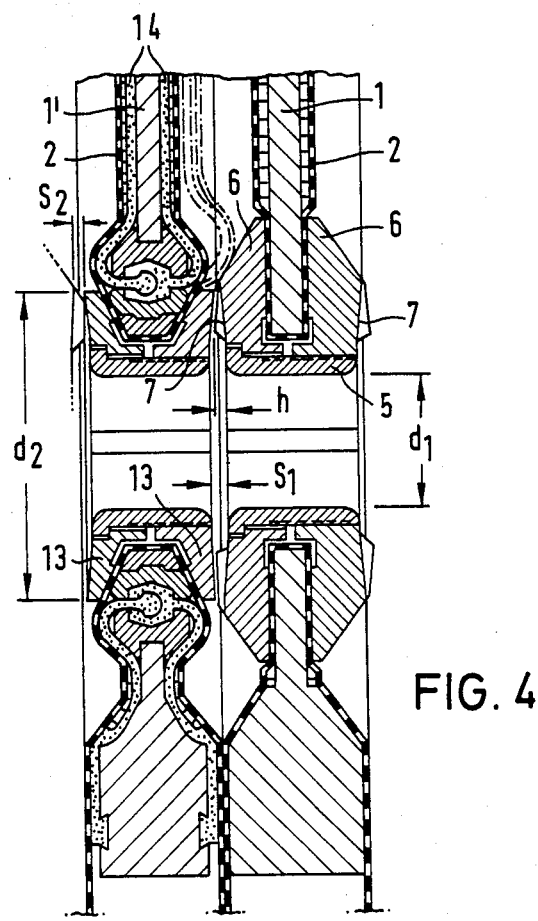
FIG. 4 is a sectional view similar to FIG. 2, illustrating another preferred embodiment of the invention.
Figure 5:
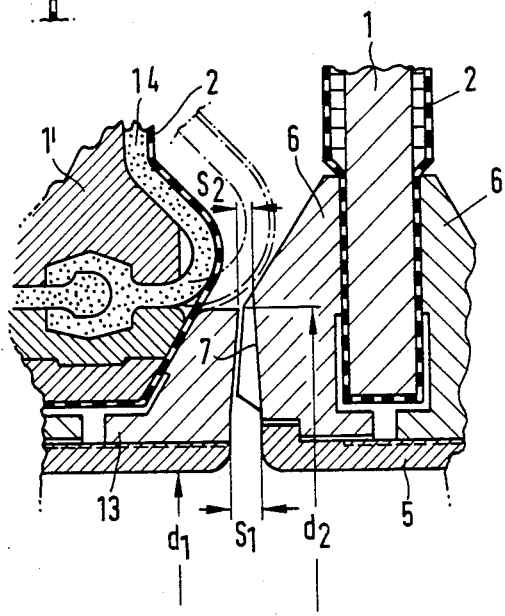
FIG. 5 is an enlarged sectional view of a detail of FIG. 4.

Turning now to the embodiment illustrated in FIGS. 4 and 5, the embodiment illustrated therein differs from that shown in FIGS. 2 and 3 only in that the gap width between the outer faces of two axially adjoining flanges decreases from a radially inner maximum value $S_1$ radially outwardly to a radially outer minimum value $S_2$. The dimensions are so selected that the cross-sectional passage area defined by the gap width $S_1$ is approximately the same as the radially outer cross-sectional passage area defined by the gap width $S_2$.

Turning now to FIG. 7, there is illustrated a further embodiment of the flanged sleeves according to the invention. Those faces of the flange 6 which are oriented towards the filter plate 1 are provided with an undercut part 17' so that in each instance at the outer edge of a flange, in the zone of its outer circumference, there is obtained an annular circumferential skirt 18 projecting towards the filter cloth 2. Upon tightening the two flanged sleeves 4 and 4' to one another by the tightening sleeve 5, there results an elastic deformation of the flange 6, so that even in case of a longitudinal expansion of the threaded tightening sleeve 5 caused, for example, by a temperature increase, the skirt 18 remains firmly and sealingly pressed to the filter cloth 2, thus ensuring a continuous fluidtight condition in that zone. As an additional measure, in the face of the skirt 18 a circumferential groove 19 may be provided which accommodates a sealing ring, such as an O-ring 20 which is deformed upon tightening of the flanged sleeves and ensures a seal even if, because of a longitudinal expansion of the tightening sleeve 5 or other external effects, the sealing force drops below a permissible minimum level at the skirt faces proper.

Turning to the embodiment illustrated in FIG. 8, the construction shown therein constitutes a variant of the embodiment shown in FIG. 7. According to FIG. 8, the filter cloths 2 which are separate filtering members for each side of the filter plate 1, are provided along their edge 21 surrounding the slurry port 3 with a circumferential bead 22 which lies in the undercut enlargement 17'. This arrangement ensures a form-fitting securement of the filter cloth 2, so that during operation the filter cloth may not escape from the filter cloth securing device. Advantageously, the bead 22 is made of an elastic material, so that by virtue of a corresponding thickness dimensioning there is provided the possibility of a preliminary pressing by the flanges, as a result of which the beads 22 simultaneously serve as sealing elements.

The present disclosure relates to subject matter contained in Federal Republic of Germany Patent Application No. P 35 40 786.7 (filed Nov. 16th, 1985) which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a filter press including a filter plate stack formed of a plurality of face-to-face arranged filter plates each having a central plane and peripheral sealing faces being in a mutually contacting sealing relationship in a closed state of the filter plate stack; adjoining filter plates together defining a peripherally sealed filter chamber; each filter plate having a slurry port from which liquid to be filtered is adapted to flow into respective said chambers; each slurry port having an axis; a filter cloth extending in each chamber along a face of each filter plate; and a filter cloth securing device arranged for clamping the filter cloth against an annular zone of said face of a respective said filter plate; said annular zone surrounding said slurry port; said filter cloth securing device including two flanged sleeves inserted into said slurry port from opposite sides thereof and a threaded tightening sleeve coaxially passing through said slurry port and threadedly engaging said flanged sleeves for tightening said flanged sleeves toward one another; each said flanged sleeve having a flange having first and second flange faces extending generally parallel to said central plane; said first flange face being oriented toward the central plane of an associated said filter plate and being arranged to clamp the filter cloth against the associated filter plate in said annular zone; said second flange face being oriented away from the central plane of the associated filter plate; the improvement wherein face-to-face oriented said second flange faces of adjoining flanged sleeves belonging to two consecutive filter plates of the filter plate stack together define, in the closed state of the filter plate stack, an annular clearance between axially aligned slurry ports belonging to said consecutive filter plates; and further wherein at least one said flanged sleeve of each said filter cloth securing device has at least one protuberance extending from the second flange face of said at least one flanged sleeve; said protuberance extending towards the second flange face of an adjoining said flanged sleeve belonging to a consecutive said filter plate; said protuberance remaining out of contact with said second flange face of said adjoining said flanged sleeve in the closed state of said filter plate stack; said protuberance having a height measured parallel to the axis of said slurry port; said height being less than said width of said annular clearance.

2. A filter press as defined in claim 1, wherein said annular clearance defines a first cross-sectional flow passage area and said slurry port has an inner diameter $d_1$ and defines a second, free cross-sectional flow passage area; further wherein said first cross-sectional flow passage area, related to said inner diameter is smaller than said second, free cross-sectional flow passage area.

3. A filter press as defined in claim 2, wherein said annular clearance has a width $S_1$ measured parallel to the axis of said slurry port; said width having a magnitude between $0.05d_1$ and $0.15d_1$.

4. A filter press as defined in claim 3, wherein said width is constant as viewed in a radial direction of said annular clearance.

5. A filter press as defined in claim 3, wherein said width decreases as viewed in a radially outward direction of said annular clearance, from a radially inner value equalling said magnitude.

6. A filter press as defined in claim 1, wherein said height is 0.5–1.5 mm less than said width.

7. A filter press as defined in claim 1, wherein said protuberance is present in a plurality on at least some of said second flange faces.

8. A filter press as defined in claim 7, wherein the protuberances projecting from at least one said second flange are two in number and are arranged in a diametrically opposite relationship; in said closed state of the filter plate stack the protuberances belonging to a common said second flange face are situated in a vertical alignment.

9. A filter press as defined in claim 1, wherein said second flange faces have a bevelled outer marginal circumferential edge zone tapering radially outwardly towards the central plane of the associated filter plate.

10. A filter press as defined in claim 9, wherein some of said filter plates are first, chamber-type filter plates and some of said filter plates are second, diaphragm chamber-type filter plates; said first and second filter plates being arranged in an alternating sequence in said filter plate stack; further wherein said bevelled zone is provided on flanged sleeves belonging solely to said first filter plates; said bevelled zone having a radially inner edge being approximately axially adjacent to a radially outer edge of an adjoining said second flange face of a flanged sleeve belonging to a consecutive second filter plate.

11. A filter press as defined in claim 1, wherein the flanged sleeves of at least some of said filter cloth securing devices have an annular skirt surrounding the slurry port and projecting axially from said first flange face towards and being in contact with said filter cloth.

12. A filter press as defined in claim 11, said skirt having a radial end face; further comprising a circumferential groove provided in said end face and a sealing element received in said groove.

13. A filter press as defined in claim 12, wherein said sealing element is an O-ring.

14. A filter press as defined in claim 1, wherein each annular clearance has a first halving plane being perpendicular to the axis of the slurry port and each filter chamber has a second halving plane being perpendicular to the axis of the slurry port; the first halving plane of any selected said annular clearance coinciding with the second halving plane of the filter chamber associated with said selected annular clearance.

* * * * *